United States Patent
O'Callaghan

(10) Patent No.: US 7,267,323 B1
(45) Date of Patent: Sep. 11, 2007

(54) BALL VALVE WITH CARTRIDGE

(75) Inventor: Jeremiah J. O'Callaghan, Enfield, CT (US)

(73) Assignee: Conval, Inc., Somers, CT (US)

( * ) Notice: Subject to any disclaimer, the term of this patent is extended or adjusted under 35 U.S.C. 154(b) by 0 days.

(21) Appl. No.: 11/441,379

(22) Filed: May 25, 2006

(51) Int. Cl.
*F16K 5/06* (2006.01)

(52) U.S. Cl. .................. 251/163; 251/192; 251/315.12

(58) Field of Classification Search ............ 251/161, 251/162, 163, 192, 315.11, 315.12; 137/375
See application file for complete search history.

(56) References Cited

U.S. PATENT DOCUMENTS

| | | | |
|---|---|---|---|
| 1,738,450 A * | 12/1929 | Ryan et al. .................. 251/170 |
| 3,657,783 A | 4/1972 | Ellis |
| 3,916,940 A | 11/1975 | Allen |
| 3,985,334 A * | 10/1976 | Domyan ................ 251/315.11 |
| 4,023,773 A | 5/1977 | Wise |
| 4,151,855 A * | 5/1979 | Levin et al. ............ 251/315.12 |
| 4,175,577 A * | 11/1979 | Kacal et al. ............ 251/315.12 |
| 4,262,691 A * | 4/1981 | Kacal ...................... 251/315.12 |
| 4,266,566 A * | 5/1981 | Kacal et al. ............. 251/316 |
| 4,313,350 A | 2/1982 | Keller, III et al. |
| 4,319,734 A | 3/1982 | Acar |
| 4,390,039 A * | 6/1983 | Johnson et al. ......... 251/315.12 |
| 4,415,037 A | 11/1983 | Brooks |
| 4,460,012 A | 7/1984 | Koumi et al. |
| 4,566,482 A * | 1/1986 | Stunkard ................ 251/315.12 |
| 4,605,036 A | 8/1986 | Smith et al. |
| 4,718,444 A * | 1/1988 | Boelte .................... 251/315.12 |
| 5,361,801 A | 11/1994 | Kerpan et al. |
| 5,531,244 A | 7/1996 | Siver |
| 6,098,660 A | 8/2000 | Hansen |
| 6,286,811 B1 | 9/2001 | Laskaris et al. |
| 6,681,793 B2 * | 1/2004 | Mike ........................... 251/163 |

* cited by examiner

*Primary Examiner*—John Bastianelli

(57) ABSTRACT

A ball valve has a valve body having a chamber, aligned inlet and outlet passages providing flow therethrough, and an access passage communicating with the chamber. A replaceable cartridge assembly is seated in the chamber and includes a generally spherical ball having a flow passage therethrough alignable with the inlet and outlet passages, an inlet valve seat, and an outlet valve seat. A cartridge body member extends about and couples the ball and the valve seats. A resiliently deflectable biasing member biases the inlet valve seat and the ball against the outlet seat. A resiliently deflectable biasing member acts upon the inlet end of the cartridge body and a deflector is movable between a first position in which the biasing member is substantially free from deflection and a second position in which the biasing member is deflected to bias the cartridge body and the outlet valve seat against the wall of the valve body chamber to effect a seat-to-body seal.

15 Claims, 6 Drawing Sheets

BALL VALVE WITH CARTRIDGE

BACKGROUND OF THE INVENTION

The present invention relates to ball valves and, more particularly, to the construction of such valves to facilitate servicing.

Ball valves are widely employed for many applications. By proper selection of materials of construction and design, they can be employed in hostile environments and to control the flow of high temperature and corrosive fluids. Under such conditions of service, even valves employing corrosion and wear resisting alloys will require periodic replacement of key components.

Some ball valves provide easy access to the operating components so that they can be removed and replaced. However, tolerances can introduce problems when the components are individually replaced, and the process of replacement in the field may require downtime for some operations in which the valves are components. In many instances, the valve must be cut out of the line in which it was installed in order to effect the repairs.

It is an object of the present invention to provide a novel ball valve in which the principal operating components are assembled in a cartridge which can be removed and replaced rapidly.

It is also an object to provide such a ball valve using a cartridge in which components can be adjusted prior to placement in the valve.

Another object is to provide such a valve which is long-lived and relatively economical to operate.

SUMMARY OF THE INVENTION

It has now been found that the foregoing and related objects may be readily attained in a ball valve having a valve body with a chamber, aligned inlet and outlet passages providing straight through flow, an access passage communicating with the chamber, which includes a generally spherical ball having a flow passage therethrough alignable with the inlet and outlet passages. An inlet valve seat seats a peripheral portion of the ball and extends about the inlet passage, and an outlet valve seat seats a peripheral portion of the ball and extends about the outlet passage.

A cartridge body member extends about and couples ball and the valve seats, and a first resiliently deflectable biasing means bears upon the cartridge body. Deflecting means is movable between a first position in which the second biasing means is substantially free from deflection and a second position deflecting the biasing means. The biasing means thus biases the cartridge body and the outlet valve seat against the wall of the valve body chamber to effect a seat-to-body seal.

Preferably, the cartridge includes second resiliently deflectable biasing means which biases the inlet valve seat and the ball against the outlet seat, and there is also included an annular sealing element between the outlet seat and the wall of the chamber.

Desirably there is included an annular spacer between the second biasing means and the deflecting means. The ball and at least the outlet seat have a wear resistant coating thereon.

Preferably, the cartridge body and the outlet seat have cooperating threaded surfaces to effect the coupling and the inlet end of the cartridge body has a flange with steps and the inlet seat is supported thereon. The biasing means are Belleville washers.

BRIEF DESCRIPTION OF THE DRAWINGS

FIG. 8 is a similar view with the cams rotated into the operative position producing the desired deflection of the Belleville washer; and.

DETAILED DESCRIPTION OF THE ILLUSTRATED EMBODIMENT

Figure 1:
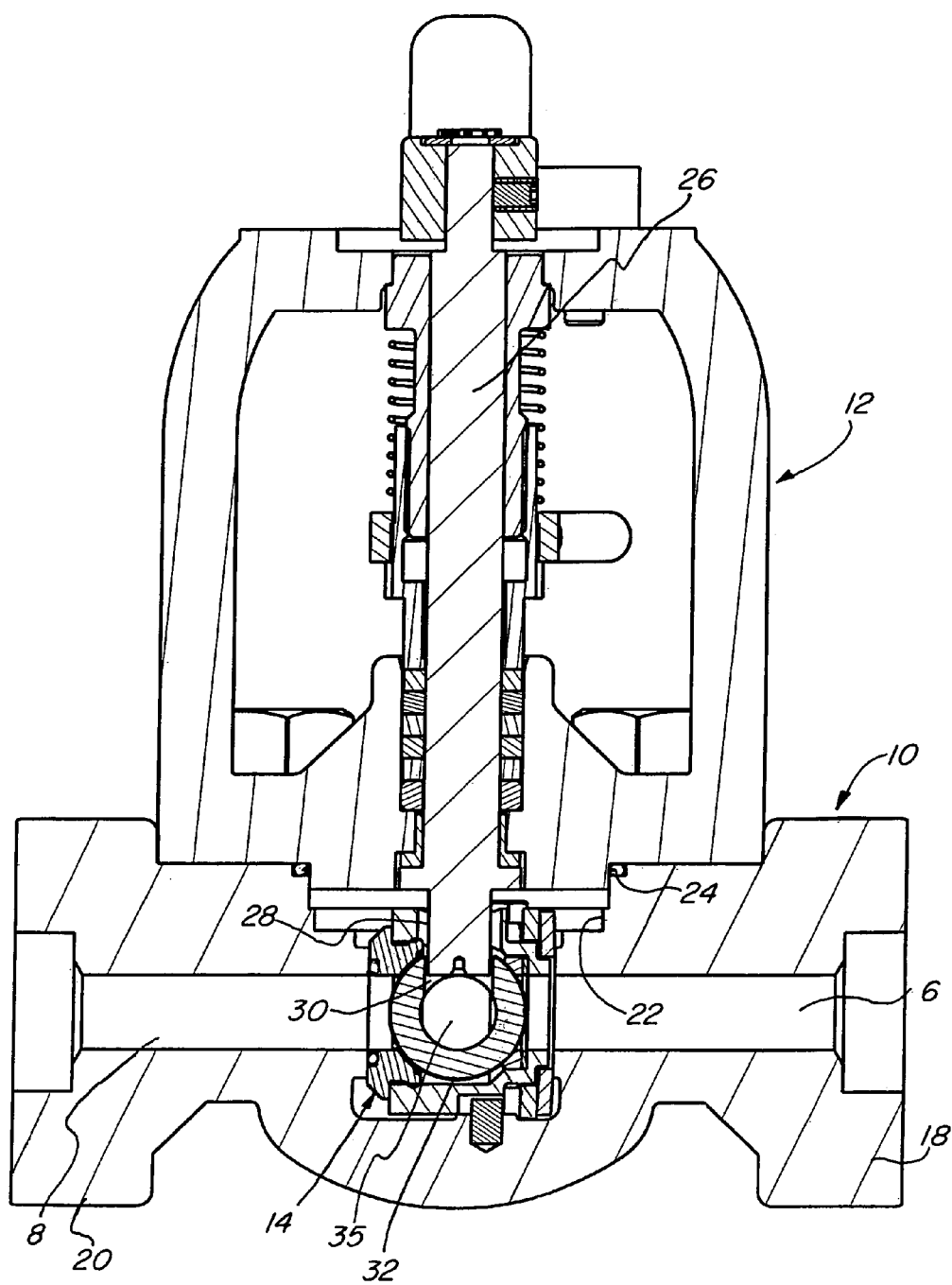
FIG. 1 is a sectional view of a ball valve embodying the present invention.
Figure 2:
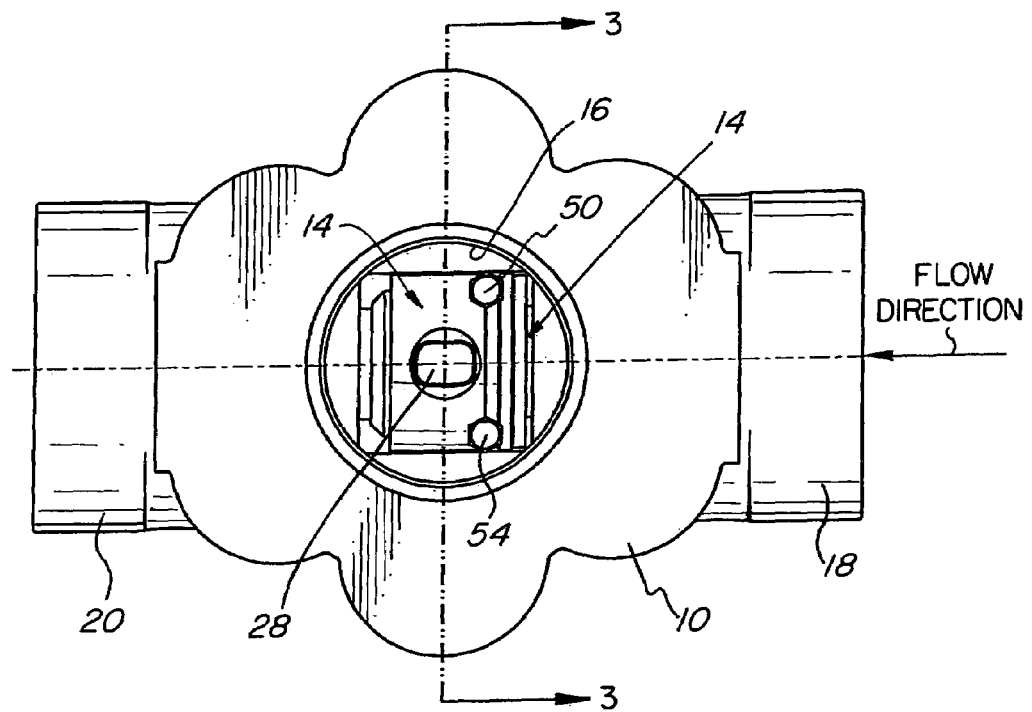
FIG. 2 is a plan view of the ball valve with the bonnet removed and drawn to an enlarged scale.
Figure 3:
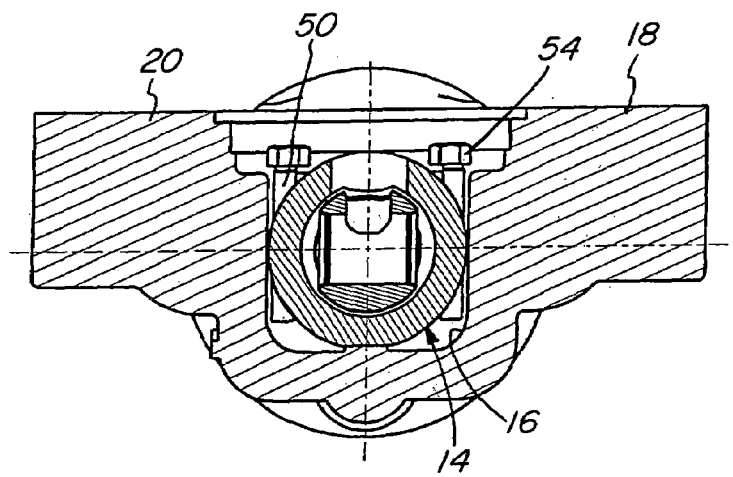
FIG. 3 is a sectional view of the valve along the line 3-3 of FIG. 2.

Turning first to FIGS. 1-3, therein illustrated is a ball valve embodying the present invention and generally comprised of a valve body generally designated by the numeral 10, a bonnet generally designated by the numeral 12, and a cartridge assembly generally designated by the numeral 14.

The valve body 10 provides a chamber 16 and has inlet and outlet ends 18, 20 with flow passages 6, 8 which are axially aligned to provide a straight through flow passage. The body 10 also has an access opening 22 to the valve body chamber 16 and a recess 24 thereabout in which the bonnet 12 is seated. The valve stem 26 is seated in the bonnet 12 and has an extension 28 in its lower end which protrudes into a slot 30 in the ball generally designated by the numeral 32. Thus, rotation of the stem 26 will rotate the ball 32 so that its flow passage 35 can be aligned with the body flow passages 6, 8.

Figure 4:
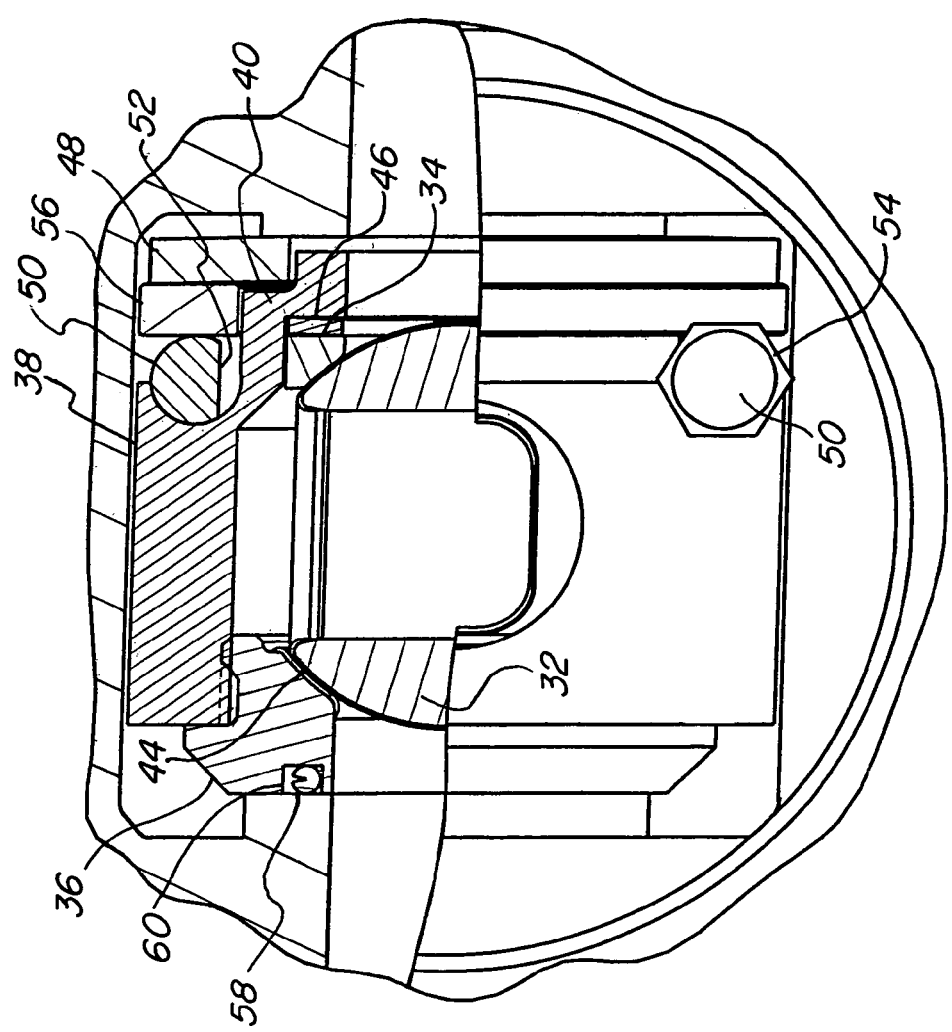
FIG. 4 is a fragmentary view of the valve in partial section.
Figure 5:
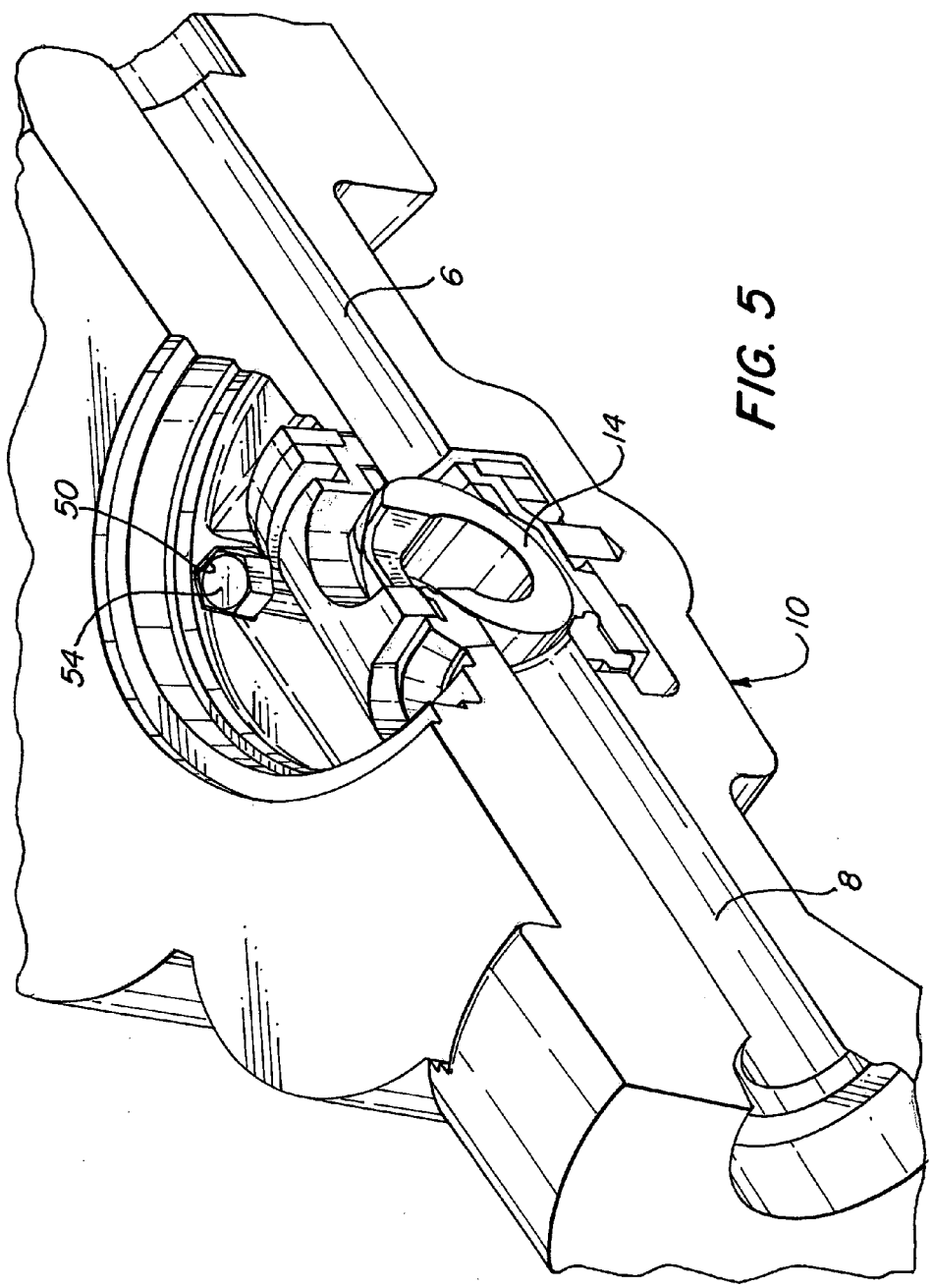
FIG. 5 is a fragmentary sectional view of the valve.

Turning next to FIGS. 4 and 5, the cartridge 14 has an annular inlet valve seat 34 and an annular outlet valve seat 36 which are secured in assembly by the annular cartridge body 38 which has an inwardly stepped depending flange 40 about its inlet end and a threaded surface portion 42 about its outlet end so that it threadably engages a cooperating threaded portion on the outlet seat 36 to assemble the several components.

The ball 32 desirably has a wear resistant coating 44 thereon as does the outlet valve seat 36. To provide a good preload or low pressure sealing load of the ball against the outlet seat 36, an annular Belleville washer 46 is provided between the inlet seat 34 and the cartridge body 38 and it acts to bias the seat against the valve ball and thus the ball against the outlet or sealing seat 36.

To ensure good sealing of the outlet seat 36 against the body chamber 16, a second larger annular Belleville washer 48 is provided between the cartridge body 38 and the wall of the inner chamber wall 16. A pair of cam rods 50 is provided and they have a flat peripheral surface portion 52 and a hexagonal head 54 at the end to facilitate their rotation. Positioned between the cam rods 50 and the Belleville washers 48 is an annular spacer 56.

Completing the assembly is an annular seal 58 which seats in a recess 60 in the outlet valve seat 36.

Assembling the valve of the present invention is facilitated by the novel cartridge assembly which can be introduced into the valve chamber in substantially complete form.

Referring to FIGS. 4-9, the cartridge assembly is conveniently assembled by inserting the small Belleville washer 46, the inlet seat 34, the ball 32 and the outlet seat 36 into the cartridge body and rotating the cartridge body 38 to threadably couple it to the outlet seat 36. The seal 58 is placed in the peripheral recess 60 on the exterior of the outlet valve seat 36.

Prior to insertion of the cartridge into the valve chamber 16, the large Belleville washer 48 and spacer 56 are placed on the inlet end of the cartridge 14. After insertion, of the cartridge assembly 14 into the valve body recess 16, the cam rods 50 are inserted and are rotated to the position seen in FIG. 8 to deflect the Belleville washer 48 and produce the desired biasing force to urge the cartridge body 38 against the outlet seat 36 and compress the seal 58.

Figure 6:
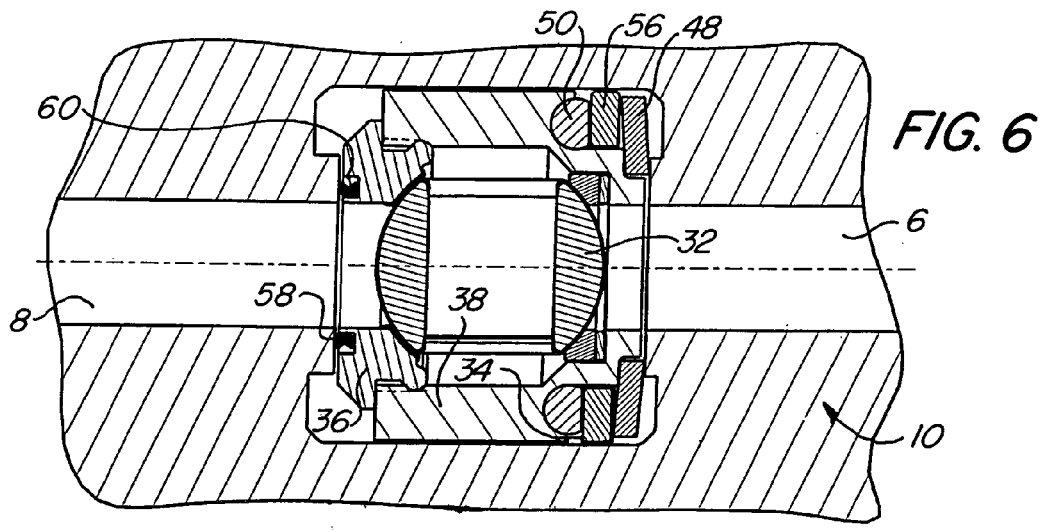
FIG. 6 is a fragmentary sectional view of the valve with the cams in the at rest position.
Figure 7:
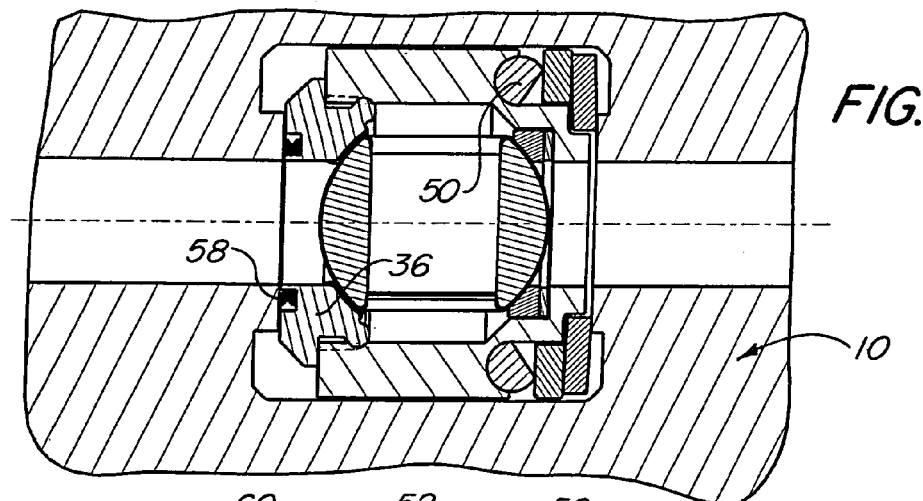
FIG. 7 is a similar view with the cams partially rotated.
Figure 8:
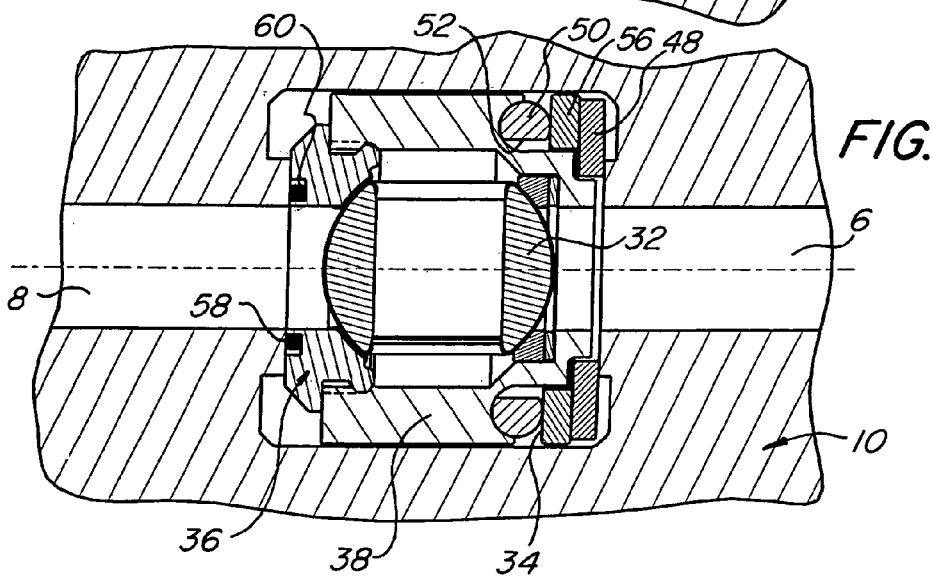
Figure 9:
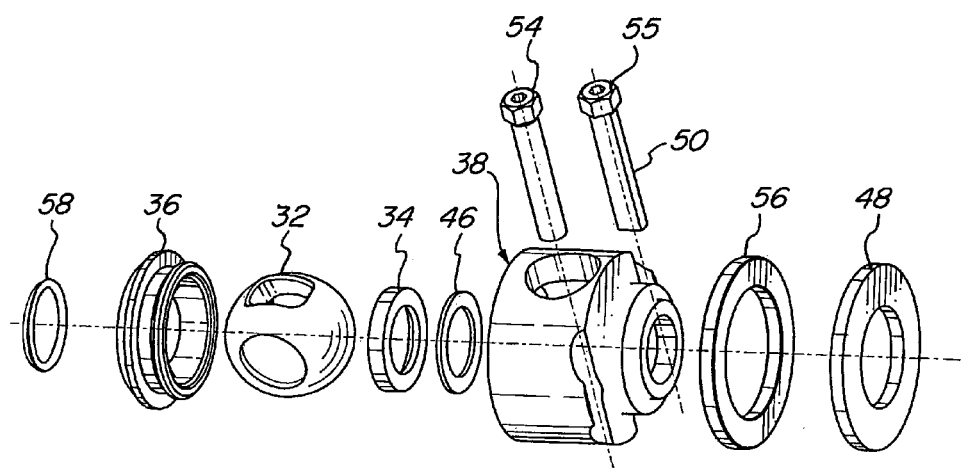
FIG. 9 is an exploded view of the cartridge components.

To remove and replace or repair the cartridge assembly, the cam rods 50 are turned to the position shown in FIG. 6 and the cartridge can be lifted out of the valve body.

It will be readily appreciated that other biasing means can be employed to provide the biasing force to seat the outlet seat against the surface of the valve body recess and the inlet seat against the ball. Annular compression springs are substitutable, but Belleville washers have proven highly effective in assembly with lesser difficulties in assembly.

A spacer for the larger washer is required in the illustrated design but could be eliminated by redesign of the inlet end.

As indicated, the ball and seats are desirably fabricated from wear resistant alloy or a surface coating of refractory metal to provide enhanced life.

Thus, it can be seen from the following detailed specification and claims that the valve of the present invention enables rapid replacement of a worn cartridge quickly and as a preassembled cartridge containing the adjusted components.

Having thus described the invention, what is claimed is:

1. In a ball valve, the combination comprising:
   (a) a valve body having a chamber, aligned inlet and outlet passages providing flow therethrough, and an access passage communicating with said chamber; and
   (b) a replaceable cartridge assembly seated in said chamber and including:
       (i) a generally spherical ball having a flow passage therethrough alignable with said inlet and outlet passages;
       (ii) an inlet valve seat seating a peripheral portion of said ball and extending about said inlet passage;
       (iii) an outlet valve seat seating a peripheral portion of said ball and extending about said outlet passage;
       (iv) first resiliently deflectable biasing means extending about the inlet end of said cartridge body; and
       (v) second resiliently deflectable biasing means biasing said inlet valve seat against said ball and said outlet seat;
       (vi) a cartridge body member extending about and coupling said second biasing means, ball and said valve seats; and
       (vii) deflecting means movable between a first position in which said first biasing means is substantially free from deflection and a second position deflecting said first biasing means, said first biasing means biasing said cartridge body and said outlet valve seat against the wall of said valve body chamber to effect a seat-to-body seal.

2. The ball valve in accordance with claim 1 wherein there is included a second resiliently deflectable biasing means biasing said inlet valve seat and said ball against said outlet seat.

3. The ball valve in accordance with claim 1 wherein said first biasing means extends about the inlet end of said cartridge body.

4. The ball valve in accordance with claim 1 wherein there is included an annular sealing element between said outlet seat and the wall of said chamber.

5. The ball valve in accordance with claim 1 wherein there is included an annular spacer between said first biasing means and said deflecting means.

6. The ball valve in accordance with claim 1 wherein said ball and at least said outlet seat have a wear resistant coating thereon.

7. The ball valve in accordance with claim 1 wherein said cartridge body and said outlet seat have cooperating threaded surfaces to effect the coupling.

8. The ball valve in accordance with claim 1 wherein the inlet end of said cartridge body has a flange with steps and said inlet seat is supported thereon.

9. The ball valve in accordance with claim 1 wherein said first and second biasing means are a Belleville washer.

10. In a ball valve, the combination comprising:
    (a) a valve body having a chamber, aligned inlet and outlet passages providing straight through flow, and an access passage communicating with said chamber; and
    (b) a replaceable cartridge assembly seated in said chamber and including:
        (i) a generally spherical ball having a flow passage therethrough alignable with said inlet and outlet passages;
        (ii) an inlet valve seat seating a peripheral portion of said ball and extending about said inlet passage;
        (iii) an outlet valve seat seating a peripheral portion of said ball and extending about said outlet passage;
        (iv) first resiliently deflectable biasing means extending about the inlet end of said cartridge body; and
        (v) second resiliently deflectable biasing means biasing said inlet valve seat against said ball and said outlet seat;
        (vi) a cartridge body member extending about and coupling said second biasing means, ball and said value seats; and
        (vii) deflecting means movable between a first position in which said first biasing means is substantially free from deflection and a second position deflecting said first biasing means, said first biasing means biasing said cartridge body and said outlet valve seat against the wall of said valve body chamber to effect a seat-to-body seal.

11. The ball valve in accordance with claim 10 wherein there is included an annular sealing element between said outlet seat and the wall of said chamber.

12. The ball valve in accordance with claim 10 wherein biasing means are Belleville washers.

13. The ball valve in accordance with claim 10 wherein there is included an annular spacer between said second biasing means and said deflecting means.

14. The ball valve in accordance with claim 10 wherein said cartridge body and said outlet seat have cooperating threaded surfaces to effect the coupling.

15. The ball valve in accordance with claim 10 wherein said ball and at least said outlet seat have a wear resistant coating thereon.

* * * * *